(12) United States Patent
Suzuki (Deceased)

(10) Patent No.: US 8,178,251 B2
(45) Date of Patent: May 15, 2012

(54) FUEL CELL SYSTEM

(75) Inventor: Hideo Suzuki (Deceased), Hamamatsu (JP); Emiko Suzuki, legal representative, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 1099 days.

(21) Appl. No.: 11/954,950

(22) Filed: Dec. 12, 2007

(65) Prior Publication Data

US 2008/0292926 A1 Nov. 27, 2008

(30) Foreign Application Priority Data

Dec. 13, 2006 (JP) ............................. P2006-335495
Apr. 4, 2007 (JP) ............................. P2007-098218

(51) Int. Cl.
*H01M 8/04* (2006.01)
(52) U.S. Cl. ........................................ 429/428
(58) Field of Classification Search ............. 429/428
See application file for complete search history.

(56) References Cited

U.S. PATENT DOCUMENTS

2005/0200462 A1* 9/2005 Maekawa et al. ............. 340/435

FOREIGN PATENT DOCUMENTS

| JP | 2002-208910 | 7/2002 |
| JP | 2002-343394 | 11/2002 |
| JP | 2003-208910 | 7/2003 |
| JP | 2006-085969 | 3/2006 |
| JP | 2006228631 | 8/2006 |
| JP | 2007141462 | 6/2007 |

* cited by examiner

*Primary Examiner* — Karie O'Neill Apicella
(74) *Attorney, Agent, or Firm* — Dickstein Shapiro LLP

(57) ABSTRACT

A fuel cell system includes a fuel cell, an auxiliary unit, a sound volume acquisition unit, and a control unit. The fuel cell supplies an electric power to a sound generating device that generates a sound. The auxiliary unit allows the fuel cell to generate the electric power. The sound volume acquisition unit acquires information that is related to at least one of the volume of the sound that is generated by the sound generating device and the volume of an environmental sound. The control unit controls the operations of the auxiliary unit, based on the information acquired by the sound volume acquisition unit.

12 Claims, 6 Drawing Sheets

FUEL CELL SYSTEM

BACKGROUND OF THE INVENTION

1. Field of the Invention

The present invention generally relates to a fuel cell system. More specifically, the present invention relates to a fuel cell system for supplying power to electronic musical instruments and PA systems.

Priorities are claimed on Japanese Patent Applications No. 2006-335495, filed Dec. 13, 2006, and No. 2007-098218, filed Apr. 4, 2007, the contents of which are incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

A fuel cell is attractive as a power supply to supply power to portable electronic devices such as note-type personal computers, electronic musical instruments and PA systems, instead of secondary batteries such as lithium ion battery and nickel hydrogen battery. The fuel cell is designed to continue supplying power with receiving a supply of fuel for a longer time as compared to the secondary batteries. It has been considered that a direct methanol fuel cell system is applied as a fuel cell for supplying a power to small electric and electronic devices. The direct methanol fuel cell system includes not only a direct methanol fuel cell but also an auxiliary unit for feeding an air as an oxygen source and a methanol solution as a fuel to the direct methanol fuel cell as well as another auxiliary unit for discharging an exhaust including carbon dioxide and a liquid waste including water as reaction product. The auxiliary units include driving devices such as pumps which generate driving sounds. Japanese Unexamined Patent Applications, First Publications, Nos. 2002-343394, 2003-208910, and 2006-085969 disclose conventional techniques for reducing sounds that have been generated by the auxiliary units.

When the fuel cell is used as a power source for the electronic musical instruments and PA systems, the auxiliary units generate driving sounds that interfere or disturb musical performances. In this case, it is desired to reduce the driving sounds that have been generated by the auxiliary units. Japanese Unexamined Patent Application, First Publication, No. 2002-343394 discloses that an expansion chamber with a large capacity is provided in order to reduce sounds that have been generated by the flow of air. The provision of the expansion chamber increases the dimensions or size of the fuel cell system.

Japanese Unexamined Patent Application, First Publication, No. 2003-208910 discloses optimized arrangements of a fuel tank, fuel cell, a liquid waste tank in order to reduce the leakage of sound noise. This optimization decreases the freedom or flexibility of design of the fuel cell system.

Japanese Unexamined Patent Application, First Publication, No. 2006-085969 discloses optimized position of a suction inlet of a pump in the auxiliary unit, so as to reduce sound noise that has been generated by the pump. This optimization decreases the freedom or flexibility of design of the fuel cell system.

In view of the above, it will be apparent to those skilled in the art from this disclosure that there exists a need for an improved apparatus and/or method. This invention addresses this need in the art as well as other needs, which will become apparent to those skilled in the art from this disclosure.

SUMMARY OF THE INVENTION

Accordingly, it is a primary object of the present invention to provide a fuel cell system.

It is another object of the present invention to provide a fuel cell system that reduces sound noises having been generated by an auxiliary unit, without changing the design of a fuel cell.

In accordance with a first aspect of the present invention, a fuel cell system may include, but is not limited to, a fuel cell, an auxiliary unit, a sound volume acquisition unit, and a control unit. The fuel cell supplies an electric power to a sound generating device that generates a sound. The auxiliary unit allows the fuel cell to generate the electric power. The sound volume acquisition unit acquires information that is related to at least one of the volume of the sound that is generated by the sound generating device and the volume of an environmental sound. The control unit controls the operations of the auxiliary unit, based on the information acquired by the sound volume acquisition unit.

In some cases, the sound volume acquisition unit may acquire the information related to the volume of the sound, from a program that instructs the sound generating device to generate the sound.

In other cases, the sound volume acquisition unit may acquire the information related to the volume of the sound, from the sound generating device.

In still other cases, the sound volume acquisition unit may acquire the information related to the volume of the sound, based on information related to an input into the sound generating device.

In yet other cases, the sound volume acquisition unit may acquire the information related to the volume of an environmental sound.

In other cases, the controller may control discontinuously the operations of the auxiliary unit, based on the information acquired by the sound volume acquisition unit.

In still other cases, the controller may control continuously the operations of the auxiliary unit, based on the information acquired by the sound volume acquisition unit.

These and other objects, features, aspects, and advantages of the present invention will become apparent to those skilled in the art from the following detailed descriptions taken in conjunction with the accompanying drawings, illustrating the embodiments of the present invention.

BRIEF DESCRIPTION OF THE DRAWINGS

Referring now to the attached drawings which form a part of this original disclosure.

DETAILED DESCRIPTION OF THE INVENTION

Figure 1:
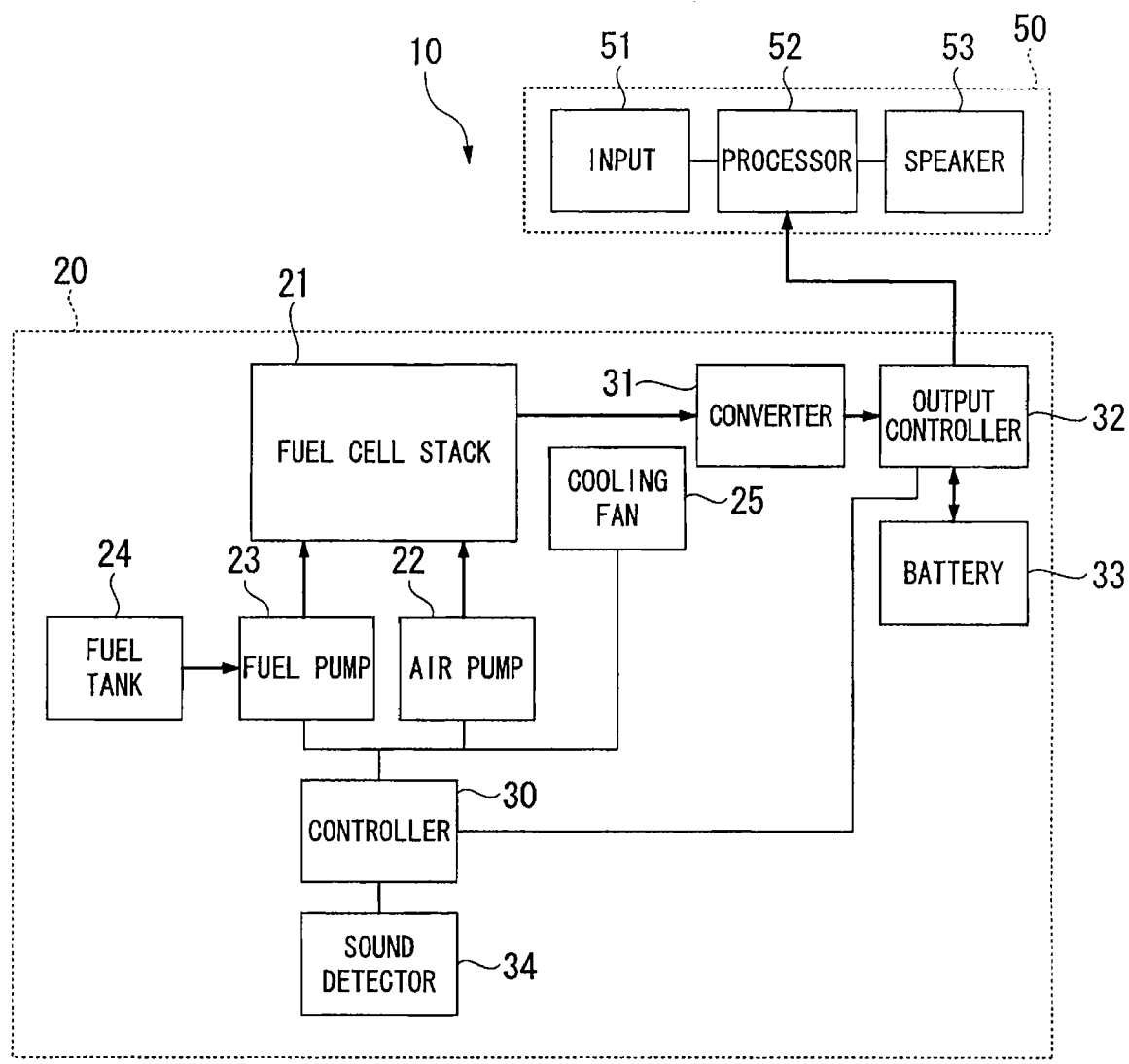
FIG. 1 is a block diagram illustrating a fuel cell system in accordance with a first embodiment of the present invention.

In accordance with one aspect of the present invention, a fuel cell system may include, but is not limited to, a fuel cell, an auxiliary unit, a sound volume acquisition unit, and a control unit. The fuel cell supplies an electric power to a sound generating device that generates a sound. The auxiliary unit allows the fuel cell to generate the electric power. The sound volume acquisition unit acquires information that is related to at least one of the volume of the sound that is generated by the sound generating device and the volume of an environmental sound. The control unit controls the operations of the auxiliary unit, based on the information acquired by the sound volume acquisition unit.

The control unit controls the operations of the auxiliary unit, based on at least one of the volume of the sound that is generated by the sound generating device and the volume of an environmental sound. The sound generating device may be realized by, but is not limited to, an electronic music equipment, or a PA system.

As the volume of the sound that is generated by the sound generating device is increased, the control unit controls the operations of the auxiliary unit so as to increase the electric power that is generated by the fuel cell. As the volume of the environmental sound is increased, the control unit controls the operations of the auxiliary unit so as to increase the electric power that is generated by the fuel cell. As both the volume of the sound that is generated by the sound generating device and the volume of an environmental sound are increased, the control unit controls the operations of the auxiliary unit so as to increase the electric power that is generated by the fuel cell.

As the volume of a sound generated by the sound generating device is increased, the power consumption by the sound generating device is increased. As the power consumption by the sound generating device is increased, the power that the fuel cell supplies to the sound generating device is increased. As the power generated by the fuel cell is increased, an air and a fuel that are supplied to the fuel cell are increased. As the air and the fuel that are supplied to the fuel cell are increased, an exhaust, a discharge and a heat radiation from the fuel cell are increased. As the air and the fuel that are supplied to the fuel cell are increased, the intensity of driving the auxiliary unit needs to be increased. As the intensity of driving the auxiliary unit is increased, the sound noise generated by driving the auxiliary unit is increased. When the auxiliary unit includes an air pump, a fuel pump and a cooling fan, then the rotational rates of the motors that drive the air pump, the fuel pump, and the cooling fan are increased, thereby increasing the sound noise generated by the auxiliary unit. Thus, as the volume of a sound generated by the sound generating device is increased, the sound noise generated by driving the auxiliary unit is increased.

As the volume of the sound that is generated by the sound generating device is decreased, the control unit controls the operations of the auxiliary unit so as to decrease the electric power that is generated by the fuel cell. As the volume of the environmental sound is decreased, the control unit controls the operations of the auxiliary unit so as to decrease the electric power that is generated by the fuel cell. As both the volume of the sound that is generated by the sound generating device and the volume of an environmental sound are decreased, the control unit controls the operations of the auxiliary unit so as to decrease the electric power that is generated by the fuel cell.

As the volume of a sound generated by the sound generating device is decreased, the power consumption by the sound generating device is decreased. As the power consumption by the sound generating device is decreased, the power that the fuel cell supplies to the sound generating device is decreased. As the power generated by the fuel cell is decreased, an air and a fuel that are supplied to the fuel cell are decreased. As the air and the fuel that are supplied to the fuel cell are decreased, an exhaust, a discharge and a heat radiation from the fuel cell are decreased. As the air and the fuel that are supplied to the fuel cell are decreased, the intensity of driving the auxiliary unit needs to be decreased. As the intensity of driving the auxiliary unit is decreased, the sound noise generated by driving the auxiliary unit is decreased. When the auxiliary unit includes an air pump, a fuel pump and a cooling fan, then the rotational rates of the motors that drive the air pump, the fuel pump, and the cooling fan are decreased, thereby decreasing the sound noise generated by the auxiliary unit. Thus, as the volume of a sound generated by the sound generating device is decreased, the sound noise generated by driving the auxiliary unit is decreased.

A large sound noise generated by the auxiliary unit may be drowned by a large sound volume generated by the sound generating device. In other words, a large sound noise generated by the auxiliary unit may not disturb a large sound volume generated by the sound generating device. A small sound noise generated by the auxiliary unit may be drowned by a small sound volume generated by the sound generating device. In other words, a small sound noise generated by the auxiliary unit may not disturb a small sound volume generated by the sound generating device. Consequently, the controller controls the operations of the auxiliary unit, so that the sound noise generated by the auxiliary unit is controlled not to disturb the sound that is generated by the sound generating device. The controller controls the operations of the auxiliary unit, based on the information related to the volume of the sound that is generated by the sound generating device.

The power consumption by the sound generating device is inter-related to the sound volume generated by the sound generating device. As the power consumption by the sound generating device is large, the sound volume generated by the sound generating device is large. As the power consumption by the sound generating device is small, the sound volume generated by the sound generating device is small. Thus, as the power consumption by the sound generating device is increased, the controller controls the operations of the auxiliary unit so as to increase the intensity of driving the auxiliary unit. As the power consumption by the sound generating device is decreased, the controller controls the operations of the auxiliary unit so as to decrease the intensity of driving the auxiliary unit. Therefore, the fuel cell system controls the sound noise that is generated by the auxiliary unit so as to avoid the sound noise from disturbing the sound that is generated by the sound generating device, without changing the design of the fuel cell.

The control unit may control the operations of the auxiliary unit based on the volume of an environmental sound. As the volume of an environmental sound is increased, the control unit may control the operations of the auxiliary unit so as to increase the electric power of the fuel cell. As the volume of an environmental sound is decreased, the control unit may control the operations of the auxiliary unit so as to decrease the electric power of the fuel cell.

A large sound noise generated by the auxiliary unit may be drowned by both a large environmental sound and a large sound volume generated by the sound generating device. A small sound noise generated by the auxiliary unit may be drowned by both a small environmental sound and a small sound volume generated by the sound generating device. Increasing the environmental sound decreases the influence of the sound noise generated by the auxiliary unit to the sound generated by the sound generating device. Decreasing the environmental sound increases the influence of the sound noise generated by the auxiliary unit to the sound generated by the sound generating device.

As the environmental sound is increased, the control unit may control the operations of the auxiliary unit to increase the intensity of driving the auxiliary unit, while increasing a sound noise that is generated by the auxiliary unit. As the environmental sound is increased, the control unit may increase the rotational rates of motors that drive the air pump, the fuel pump and the cooling fan in the auxiliary unit, while increasing the sound noises generated by the motors. As the rotational rates of motors that drive the air pump, the fuel pump and the cooling fan are increased, the electric power generated by the fuel cell is increased.

As the environmental sound is decreased, the control unit may control the operations of the auxiliary unit to decrease the intensity of driving the auxiliary unit, while decreasing a sound noise that is generated by the auxiliary unit. As the environmental sound is decreased, the control unit may decrease the rotational rates of motors that drive the air pump, the fuel pump and the cooling fan in the auxiliary unit, while decreasing the sound noises generated by the motors. As the rotational rates of motors that drive the air pump, the fuel pump and the cooling fan are decreased, the electric power generated by the fuel cell is decreased.

Therefore, the fuel cell system controls the sound noise that is generated by the auxiliary unit so as to avoid the sound noise from disturbing the sound that is generated by the sound generating device, without changing the design of the fuel cell.

In some cases, the sound volume acquisition unit may acquire the information related to the volume of the sound, from a program that instructs the sound generating device such as the electronic music instrument or the PA system to generate the sound or music. In many cases, the sound generating performance or the music performance by the sound generating device is often programmed or reduced based on the previous performance in rehearsal. Thus, the sound volume acquisition unit may acquire the program for generating the sound or performing the music. Otherwise, the sound volume acquisition unit may acquire information related to the volume of the sound or music that is to be performed by the sound generating device such as the electronic music instrument or the PA system. The control unit controls the operations of the auxiliary unit by synchronizing with the actual performance by the sound generating device such as the electronic music instrument or the PA system. Thus, the control unit controls the sound noise from the auxiliary unit by synchronizing with the actual performance by the sound generating device such as the electronic music instrument or the PA system.

In other cases, the sound volume acquisition unit may acquire the information related to the volume of the sound, from the sound generating device such as the electronic music instrument or the PA system. The control unit controls the operations of the auxiliary unit, based on the volume of a sound or music being performed actually by the sound generating device such as the electronic music instrument or the PA system. Thus, the control unit controls the sound noise from the auxiliary unit based on the volume of a sound or music being performed actually by the sound generating device such as the electronic music instrument or the PA system.

In still other cases, the sound volume acquisition unit may acquire the information related to the volume of the sound, based on information related to an input into the sound generating device such as the electronic music instrument or the PA system. The sound generating device such as the electronic music instrument or the PA system may have an input unit such as a key board, strings or valves. The sound generating device such as the electronic music instrument or the PA system adjusts the volume of a sound based on the amount of an input. The volume of the sound generated by the sound generating device such as the electronic music instrument or the PA system is inter-related to the input into the input unit of the sound generating device. The control unit controls the operations of the auxiliary unit, based on the input into the input unit of the sound generating device. Thus, the control unit controls the sound noise from the auxiliary unit based on the input into the input unit of the sound generating device.

In other cases, the controller may control discontinuously the operations of the auxiliary unit, based on the volume of a sound or music that is acquired by the sound volume acquisition unit. The control unit selects one of different operational states based on the genre of music to be performed by the sound generating device such as the electronic music instrument or the PA system. Thus, the control unit controls the sound noise from the auxiliary unit based on the volume of the sound or music performed by the sound generating device such as the electronic music instrument or the PA system.

In still other cases, the controller may control continuously the operations of the auxiliary unit, based on the volume of a sound or music that is acquired by the sound volume acquisition unit. The control unit continues to control the operations of the auxiliary unit, based on the volume of a sound or music generated or performed by the sound generating device such as the electronic music instrument or the PA system. Thus, the control unit controls the sound noise from the auxiliary unit based on the volume of the sound or music performed by the sound generating device such as the electronic music instrument or the PA system.

In other cases, the sound volume acquisition unit may include a storage unit that stores acoustic data, based on which the sound generating device generates the sound, so that the control unit that controls the operations of the auxiliary unit, based on at least a part of the acoustic data.

In accordance with another aspect of the present invention, a fuel cell system may include, but is not limited to, a fuel cell, an auxiliary unit, a storage unit, and a control unit. The fuel cell may be configured to supply an electric power to a sound generating device that generates a sound. The auxiliary unit may be configured to allow the fuel cell to generate the electric power. The storage unit may be configured to store acoustic data, based on which the sound generating device generates the sound. The control unit controls the operations of the auxiliary unit, based on at least a part of the acoustic data.

In other cases, the acoustic data may include information related to the volume of the sound, and the control unit may control the operations of the auxiliary unit based on the information related to the volume of the sound.

The fuel cell system may further include a power instruction unit, and a replay instruction unit. The power instruction unit controls power generated by the fuel cell, based on the acoustic data. The replay instruction unit supplies instructions to the sound generating device to perform or replay the sound.

In accordance with still another aspect of the present invention, a power control system is provided for controlling power generated by a fuel cell. The fuel cell is controlled by an auxiliary unit to supply an electric power to a sound generating device that generates a sound. The power control system may include a storage unit, a sound volume acquisition unit, and a control unit. The storage unit stores acoustic data, based on which the sound generating device generates the sound. The sound volume acquisition unit acquires information that is related to at least one of the volume of the sound that is generated by the sound generating device. The control unit controls the operations of the auxiliary unit, based on the information acquired by the sound volume acquisition unit.

Selected embodiments of the present invention will now be described with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

FIG. 1 is a block diagram illustrating a fuel cell system in accordance with a first embodiment of the present invention. A fuel cell system 10 includes a fuel cell unit 20 and an electronic musical instrument 50. In some cases, the electronic musical instrument 50 may integrate the fuel cell unit 20 therein. In other cases, the fuel cell unit 20 is disposed outside the electronic musical instrument 50. Typically, the fuel cell unit 20 is adjacent to the electronic musical instrument 50. It is possible as a modification that the fuel cell system 10 includes the fuel cell unit 20 and an PA (Public Address) system instead of the electronic musical instrument 50.

The fuel cell unit 20 may include a fuel cell stack 21. The fuel cell stack 21 may include a stack of one or more fuel cells. The fuel cell may be realized by, but is not limited to, a direct methanol fuel cell (DMFC), which is configured to cause a reaction between methanol as a fuel and oxygen in the air, thereby generating power. The fuel cell may include, but is not limited to, a fuel electrode as an anode, an air electrode as a cathode, and an electrolyte membrane that is interposed between the fuel electrode and the air electrode. A methanol solution as a fuel is supplied to a fuel electrode side in which the fuel electrode as the anode is provided. An oxygen-containing air is supplied to an air electrode in which the air electrode as the cathode is provided. The fuel electrode side generates a reaction product of carbon dioxide. The air electrode side generates another reaction product of waste water. Carbon dioxide is discharged from the fuel electrode side. Waste water is discharged from the air electrode side.

The direct methanol fuel cell (DMFC) is designed to cause the following reactions.

Fuel Electrode: $CH_3OH + H_2O \rightarrow CO_2 + 6H^+ + 6e^-$

Air Electrode: $O_2 + 4H^+ + 4e^- \rightarrow 2H_2O$

DMFC: $2CH_3OH + 3O_2 \rightarrow 2CO_2 + 4H_2O$

The fuel cell unit 20 may further include an air pump 22 and a fuel pump 23. The air pump 22 introduces an air therein from atmosphere. The air pump 22 supplies the air to the air electrode of the fuel cell stack 21. The fuel cell unit 20 may further include a fuel tank 24 that holding a fuel of methanol solution. The fuel pump 23 has a fuel intake side that is coupled to the fuel tank 24 so as to supply the fuel in the fuel tank 24 to the fuel electrode of the fuel cell stack 21.

The fuel cell stack 21 causes oxidation of methanol as fuel, thereby generating heat. The fuel cell unit 20 may further include a cooling fan 25 that cools the fuel cell stack 21. The cooling fan 25 performs air-blow to the fuel cell stack 21 to promote heat radiation from the fuel cell stack 21.

As described above, the fuel cell system 10 includes an auxiliary unit that may include one or more elements which allow the fuel cell stack 21 to exhibit the best or better performances. Typical examples of the auxiliary unit may include, but are not limited to, the air pump 22, the fuel pump 23, and the cooling fan 25. The air pump 22, the fuel pump 23, and the cooling fan 25 may be driven by, but not limited to, electric motors.

The fuel cell unit 20 may furthermore include a controller 30, a converter 31, an output controller 32, and a battery 33. The battery 33 may be, but is not limited to, a secondary battery. The controller 30 may include a microcomputer which may further include a CPU, a RAM and a ROM. The controller 30 controls the air pump 22, the fuel pump 23, and the output controller 32. The fuel cell unit 20 may also include a sound detector 34. The sound detector 34 is connected to the controller 30. The sound detector 34 detects sound volume. The sound detector 34 may include, but is not limited to, a sound pressure sensor that detects the volume of a sound that is generated by the electronic musical instrument 50. The sound detector 34 converts the detected sound volume into an electrical signal. The sound detector 34 supplies the electrical signal representing the detected sound volume to the controller 30.

The converter 31 is connected to the output side of the fuel cell stack 21. The converter 31 receives the power from the fuel cell stack 21 and converts the power into a converted power to be supplied to the electronic musical instrument 50. The battery 33 may be a secondary battery. Typical examples of the secondary battery may include, but are not limited to, a lithium ion battery, a nickel hydrogen battery, and a lead storage battery. The battery 33 stores a part of the power that has been generated by the fuel cell stack 21. The battery 33 supplies a supplemental power to the electronic musical instrument 50 when the amount of power generated by the fuel cell stack 21 is insufficient. The supplemental power generated by the battery 33 and the power generated by the fuel cell stack 21 are supplied together to the electronic musical instrument 50 when the amount of power generated by the fuel cell stack 21 is lower than the amount that needs for the electronic musical instrument 50.

The output controller 32 controls the supplies of the powers generated by the fuel cell stack 21 and the battery 33. The control by the output controller 32 is made based on whether the amount of power generated by the fuel cell stack 21 is higher or lower than the amount that needs for the electronic musical instrument 50. when the amount of power generated by the fuel cell stack 21 is equal to or higher than the amount that needs for the electronic musical instrument 50, then the output controller 32 supplies the power generated by the fuel cell stack 21 to not only the electronic musical instrument 50 but also the battery 33. When the amount of power generated by the fuel cell stack 21 is lower than the amount that needs for the electronic musical instrument 50, then the output controller 32 supplies the power generated by the fuel cell stack 21 together with the supplemental power generated by the battery 33 to the electronic musical instrument 50.

The electronic musical instrument 50 may be realized by, but not limited to, any instruments such as keyboard musical instruments, stringed musical instruments, and pipe musical instruments. Typical examples of the keyboard musical instruments may include, but are not limited to, electronic pianos, electronic organs so called to as "Electone" which is the registered trademark, and keyboards. A typical example of the stringed musical instruments may include, but is not limited to, electric guitar. In this embodiment the following descriptions will be made when the electronic musical instrument 50 is realized by an electronic piano. The electronic musical instrument 50 may include, but is not limited to, an input unit 51, a processor 52 and a speaker 53. In case of the electronic piano, the input unit 51 may include a keyboard which allows the entry of external instructions. The processor 52 generates a tone or sound in accordance with the external instructions entered from the input unit 51. The speaker 53 speaks the generated tone or sound.

Operations of the fuel cell system 10 will be described.

When the electronic musical instrument 50 performs music, the sound detector 34 detects the volume of the sound or tone and converts the detected sound volume into an electrical signal representing the detected sound volume. The electrical signals representing the volumes of the detected sounds are supplied to the controller 30 so that the controller 30 detects or evaluates the music volume based on the electrical signals. The controller 30 controls operations of the air pump 22, the fuel pump 23, and the cooling fan 25, based on the detected volume.

As the detected volume increases, the controller 30 increases the supply rates at which the fuel pump 23 and the air pump 22 supply the fuel and air, respectively, and also the controller 30 increases the rotational rate of the cooling fan 25, thereby increasing the amount of power generated by the fuel cell unit 20. As the detected volume decrease, the controller 30 decreases the supply rates at which the fuel pump 23 and the air pump 22 supply the fuel and air, respectively, and also the controller 30 decreases the rotational rate of the cooling fan 25.

In this embodiment, the auxiliary unit including the air pump 22, the fuel pump 23 and the cooling fan 25 may have three operational modes, for example, "silent mode", "medium mode", and "power mode". The controller 30 switches the operational modes of auxiliary unit. As described above, the air pump 22, the fuel pump 23 and the cooling fan 25 may be driven by individual motors respectively. The controller 30 switches the operational modes, while the controller 30 changing the rotational rates of the individual motors that drive the air pump 22, the fuel pump 23 and the cooling fan 25, respectively.

When the controller 30 places the auxiliary unit in the "power mode", then the controller 30 controls the air pump 22, the fuel pump 23 and the cooling fan 25 to operate at almost 100% of the maximum performances thereof. Namely, the controller 30 drives the individual motors near at the maximum rotational rates that have previously been set for them, while the individual motors driving the air pump 22, the fuel pump 23 and the cooling fan 25.

The "medium mode" is an operational mode between the "power mode" and the "silent mode". When the controller 30 places the auxiliary unit in the "medium mode", then the controller 30 controls the air pump 22, the fuel pump 23 and the cooling fan 25 to operate at almost 50% of the maximum performances thereof. Namely, the controller 30 drives the individual motors at about 50% of the maximum rotational rate, while the individual motors driving the air pump 22, the fuel pump 23 and the cooling fan 25.

When the controller 30 places the auxiliary unit in the "silent mode", then the controller 30 controls the air pump 22, the fuel pump 23 and the cooling fan 25 to discontinue operations thereof. Namely, the controller 30 stops the individual motors to discontinue driving the air pump 22, the fuel pump 23 and the cooling fan 25. In the "silent mode", the controller 30 causes the battery 33 to supply the supplemental power to the electronic musical instrument 50. It is possible as a modification that, in the "silent mode", an alternative supply can be made of methanol solution or vaporized methanol as fuel to the fuel cell stack 21 so as to allow that the fuel cell stack 21 performs generation of power at a lower level than the ordinal level, while the auxiliary unit does not operate.

Figure 2:
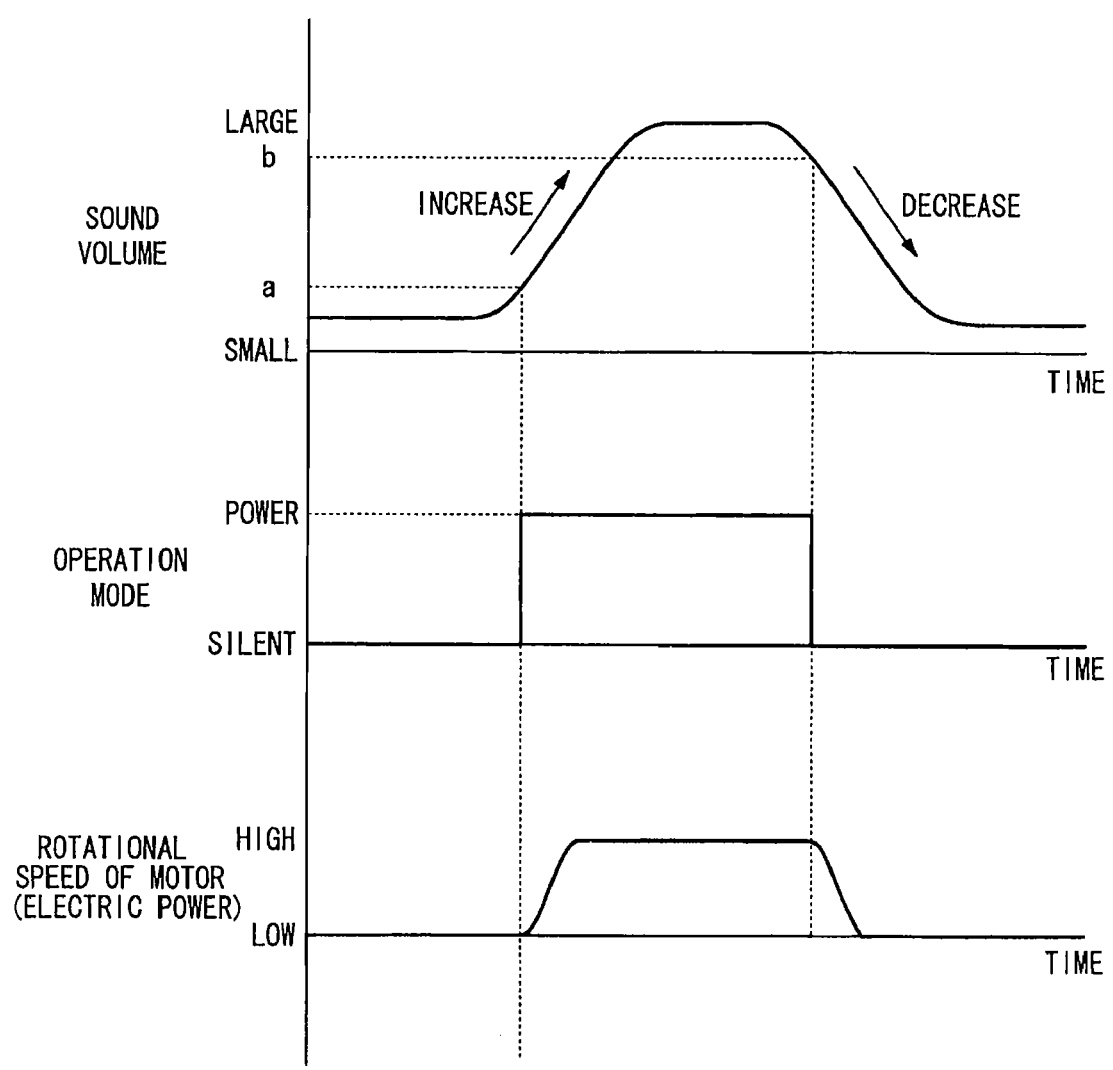
FIG. 2 is a graph illustrating inter-relationships among the sound volume, operation modes, and rotational speed of motor in connection with the fuel cell system of FIG. 1.

FIG. 2 is a graph illustrating inter-relationships among the sound volume, operation modes, and rotational speed of motor. In FIG. 2, "SOUND VOLUME" represents the time-variation of the volume of a sound performed by the electronic musical instrument 50. "a" represents a first threshold of the sound volume. "b" represents a second threshold of the sound volume. "OPERATION MODE" represents the time-variation of the operation mode switched between the "power mode" and the "silent mode" of the auxiliary unit, provided that the auxiliary unit is not placed in the "medium mode" for the purpose of simplifying the descriptions. "ROTATIONAL SPEED OF MOTOR (ELECTRIC POWER)" represents the rotational speed at which each motor drives a corresponding one of the air pump 22, the fuel pump 23 and the cooling fan 25.

When the volume of a sound performed by the electronic musical instrument 50 increases and reaches the first threshold "a", the controller 30 switches the "silent mode" to the "power mode", and increases the rotational rate of each motor that drives the corresponding one of the air pump 22, the fuel pump 23 and the cooling fan 25. When, after the sound volume becomes larger than the second threshold "b", the sound volume decreases and reaches the second threshold "b", then the controller 30 switches the "power mode" into the "silent mode", and decreases the rotational rate of each motor that drives the corresponding one of the air pump 22, the fuel pump 23 and the cooling fan 25.

The volume of operating-sound of the auxiliary unit that includes the air pump 22, the fuel pump 23 and the cooling fan 25 is correlated to the rotational rates of the motors that drive the air pump 22, the fuel pump 23 and the cooling fan 25. Increasing the rotational rates of the motors that drive the air pump 22, the fuel pump 23 and the cooling fan 25 increases the volume of operating-sound of the auxiliary unit that includes the air pump 22, the fuel pump 23 and the cooling fan 25. Decreasing the rotational rates of the motors decreases the volume of operating-sound of the auxiliary unit.

The switch of the operation mode of the auxiliary unit that includes the air pump 22, the fuel pump 23 and the cooling fan 25 is performed based on the volume of a sound performed by the electronic musical instrument 50.

In accordance with the first embodiment, the operation mode of the auxiliary unit that includes the air pump 22, the fuel pump 23 and the cooling fan 25 is switched based on the volume of a sound performed by the electronic musical instrument 50. As the electronic musical instrument 50 speaks large sound, the auxiliary unit that includes the air pump 22, the fuel pump 23 and the cooling fan 25 generates large sound. As the electronic musical instrument 50 speaks small sound, the auxiliary unit that includes the air pump 22, the fuel pump 23 and the cooling fan 25 generates small sound.

In some cases, the first threshold "a" gives the controller 30 a threshold to switch the "silent mode" to the "power mode" when the sound volume is increased across the first threshold "a". The second threshold "b" gives the controller 30 another threshold to switch the "power mode" to the "silent mode" when the sound volume is decreased across the first threshold "a". The first threshold "a" is lower than the second threshold "b". A time is lapsed until the rotational rates of the motors driving the air pump 22, the fuel pump 23 and the cooling fan 25 reach the target rates after the operational mode is switched. Namely, a time delay is caused until the rotational rates of the motors driving the air pump 22, the fuel pump 23 and the cooling fan 25 reach the target rates since the operational mode is switched.

The sound volume generated by the electronic musical instrument 50 has already become large, before the rotational rates of the motors driving the air pump 22, the fuel pump 23 and the cooling fan 25 reach the high rates, thereby preventing the driving of the motors from disturbing the musical performance of the electronic musical instrument 50. If the rotational rates of the motors driving the air pump 22, the fuel pump 23 and the cooling fan 25 stilt remain high after the sound volume generated by the electronic musical instrument 50 has already become small, then the musical performance of the electronic musical instrument 50 is likely to be disturbed. However, the second threshold "b" is set higher than the first threshold "a". When the sound volume decreases and reaches the second threshold "b", the controller 30 switches the "power mode" to the "silent mode", thereby decreasing the rotational rates of the motors driving the air pump 22, the fuel pump 23 and the cooling fan 25. The rotational rates of the motors have already been decreased and reached to the low level, at the same time or before the sound volume decreases and reaches the first threshold "a" which is lower than the second threshold "b". The time period in which the rotational rates of the motors have been decreased from the high rate to the low rate is equal to or shorter than the time period in which the sound volume is decreased from the second threshold "b" to the first threshold "a". The rotational rates of the motors have already been low when the sound volume is decreased and reached to the first threshold "a".

The first threshold "a" for switching the "silent mode" to the "power mode" and the second threshold "b" for switching the "power mode" to the "silent mode" can be optionally set by a user as long as the second threshold "b" is higher than the first threshold "a". In some cases, a user can set the first and second thresholds "a" and "b" depending on the genre of music. Needless to say, it is possible to optionally set three different thresholds for switching among the "silent mode", the "medium mode" and the "power mode".

In accordance with the first embodiment, the rotational rates of the motors driving the air pump 22, the fuel pump 23 and the cooling fan 25 are controlled based on the sound volume that is generated by the electronic musical instrument 50. The sound volume generated by the electronic musical instrument 50 is correlated to the power consumption by the electronic musical instrument 50. As the sound volume generated by the electronic musical instrument 50 is increased, the power consumption by the electronic musical instrument 50 is also increased. As the sound volume generated by the electronic musical instrument 50 is decreased, the power consumption by the electronic musical instrument 50 is also decreased.

When the power consumption by the electronic musical instrument 50 is increased, the controller 30 evaluates that the sound volume generated by the electronic musical instrument 50 is increased. In this case, the controller 30 increases the rotational rates of the motors that drive the air pump 22, the fuel pump 23 and the cooling fan 25, while noises caused by the rotations of the motors is increased. The increased noises caused by increasing the rotational rates of the motors may cause almost no substantive disturbance to the musical performance at larger sound volume by the electronic musical instrument 50.

When the power consumption by the electronic musical instrument 50 is decreased, the controller 30 evaluates that the sound volume generated by the electronic musical instrument 50 is decreased. In this case, the controller 30 decreases the rotational rates of the motors that drive the air pump 22, the fuel pump 23 and the cooling fan 25, while noises caused by the rotations of the motors is decreased. The decreased noises caused by decreasing the rotational rates of the motors may cause almost no substantive disturbance to the musical performance at smaller sound volume by the electronic musical instrument 50.

The operation of the fuel cell unit 20 is adjusted based on the power consumption by the electronic musical instrument 50, namely based on the sound volume generated by the electronic musical instrument 50, thereby adjusting the noises to be generated by the motors that drive the air pump 22, the fuel pump 23 and the cooling fan 25. This configuration allows reducing the noises of the auxiliary unit without any change to the design of the electronic musical instrument 50, so as to prevent the noises of the auxiliary unit from disturbing the music performance by the electronic musical instrument 50.

The auxiliary unit has a plurality of operation modes, one of which the controller 30 selects, based on the sound volume generated by the electronic musical instrument 50. The controller 30 controls the operations of the auxiliary unit, based on the sound volume generated by the electronic musical instrument 50.

The threshold for switching the operational mode when the sound volume is increasing is lower than the threshold for switching the operational mode when the sound volume is decreasing. For example, the sound volume generated by the electronic musical instrument 50 has already become large, before the rotational rates of the motors driving the air pump 22, the fuel pump 23 and the cooling fan 25 reach the high rates, and thereby preventing that the increased noises generated the motors from disturbs the musical performance at increased sound volume of the electronic musical instrument 50. The rotational rates of the motors have already been decreased and reached to the low level, at the same time or before the sound volume decreases. The time period in which the rotational rates of the motors have been decreased from the high rate to the low rate is equal to or shorter than the time period in which the sound volume is decreased. The rotational rates of the motors have already been low when the sound volume is decreased. This configuration allows reducing the noises of the auxiliary unit without any change to the design of the electronic musical instrument 50, and prevents the noises of the auxiliary unit from disturbing the music performance by the electronic musical instrument 50.

Modification:

In accordance with the above-described first embodiment, the controller 30 is configured to switch among a plurality of operational modes or to discontinuously vary the rotational rates of the motors that drive the air pump 22, the fuel pump 23 and the cooling fan 25, based on the plural thresholds across which the sound volume generated by the electronic musical instrument 50 varies.

The first embodiment as described above can be modified as follows. The controller 30 can be modified to make continuous variation of the operations of the auxiliary unit, based on the continuous variation of the sound volume generated by the electronic musical instrument 50. Namely, the controller 30 can be modified to continuously vary the rotational rates of the motors that drive the air pump 22, the fuel pump 23 and the cooling fan 25, based on the continuous variation of the sound volume generated by the electronic musical instrument 50. The sound volume can, as described above, be detected by the sound detector 34. This modification allows the controller 30 to continuously vary the operations of the fuel cell unit 20 based on the sound volume in the wide range, the sound volume being generated by the electronic musical instrument 50.

The above-described modification of the first embodiment provides further advantages. If the controller 30 is configured to continuously control the operations of the auxiliary unit in the fuel cell unit 20, then a user can optionally set a correlation between the sound volume and the rotational rates of the motors driving the air pump 22, the fuel pump 23 and the cooling fan 25, or another correlation between the sound volume and the power generated by the fuel cell unit 20. The rotational rates of the motors driving the air pump 22, the fuel pump 23 and the cooling fan 25 are correlated to the power generated by the fuel cell unit 20. In general, increasing the rotational rates of the air pump 22, the fuel pump 23 and the cooling fan 25 increases the power generated by the fuel cell unit 20. The above-described correlation can be set based on the type of music or the genre of music.

Figure 3A:
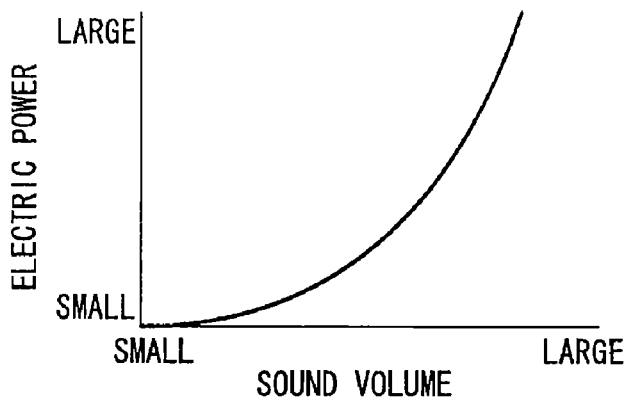
FIG. 3A is a diagram illustrating a first example of correlation between the electric power and the sound volume, which can be set for a classic music, in the fuel cell system of FIG. 1.

FIG. 3A is a diagram illustrating a first example of correlation between the electric power and the sound volume, which can be set for a classic music, in the fuel cell system 10 of FIG. 1. In general, classic music is likely to have a wide range of sound volume. In accordance with the first example of correlation for the classic music, the electric power generated by the fuel cell unit 20 can be increased to draw a quadratic curve as the sound volume is increased, wherein the gradient of the quadratic curve is increased by increasing the sound volume. As the sound volume is in the small range, the electric power remains in the low range.

Figure 3B:
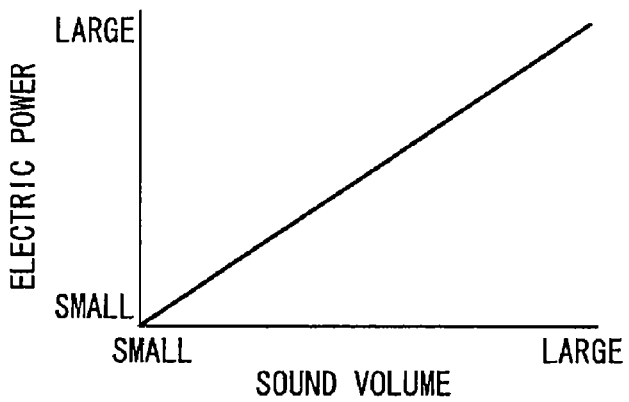
FIG. 3B is a diagram illustrating a second example of correlation between the electric power and the sound volume, which can be set for a popular music, in the fuel cell system of FIG. 1.

FIG. 3B is a diagram illustrating a second example of correlation between the electric power and the sound volume, which can be set for a popular music, in the fuel cell system 10 of FIG. 1. In accordance with the second example of correlation for the popular music, the electric power generated by the fuel cell unit 20 can be proportionally increased as the sound volume is increased.

Figure 3C:
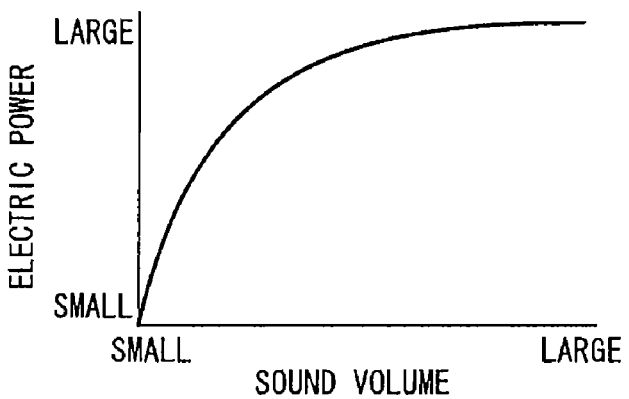
FIG. 3C is a diagram illustrating a third example of correlation between the electric power and the sound volume, which can be set for a rock music, in the fuel cell system of FIG. 1.

FIG. 3C is a diagram illustrating a third example of correlation between the electric power and the sound volume, which can be set for a rock music, in the fuel cell system 10 of FIG. 1. In general, rock music is likely to have a limited range of sound volume at higher level than the classic music. In accordance with the third example of correlation for the rock music, the electric power generated by the fuel cell unit 20 can be increased to draw a curve as the sound volume is increased, wherein the gradient of the curve is decreased by increasing the sound volume. As the sound volume is in the small range, the electric power is greatly increased.

In accordance with the above-described first embodiment, the auxiliary unit has three operational modes, for example, the "silent mode", the "medium mode" and "power mode". It is possible as a modification to set two operational modes or four or more operational modes for the auxiliary unit.

Second Embodiment

Figure 4:
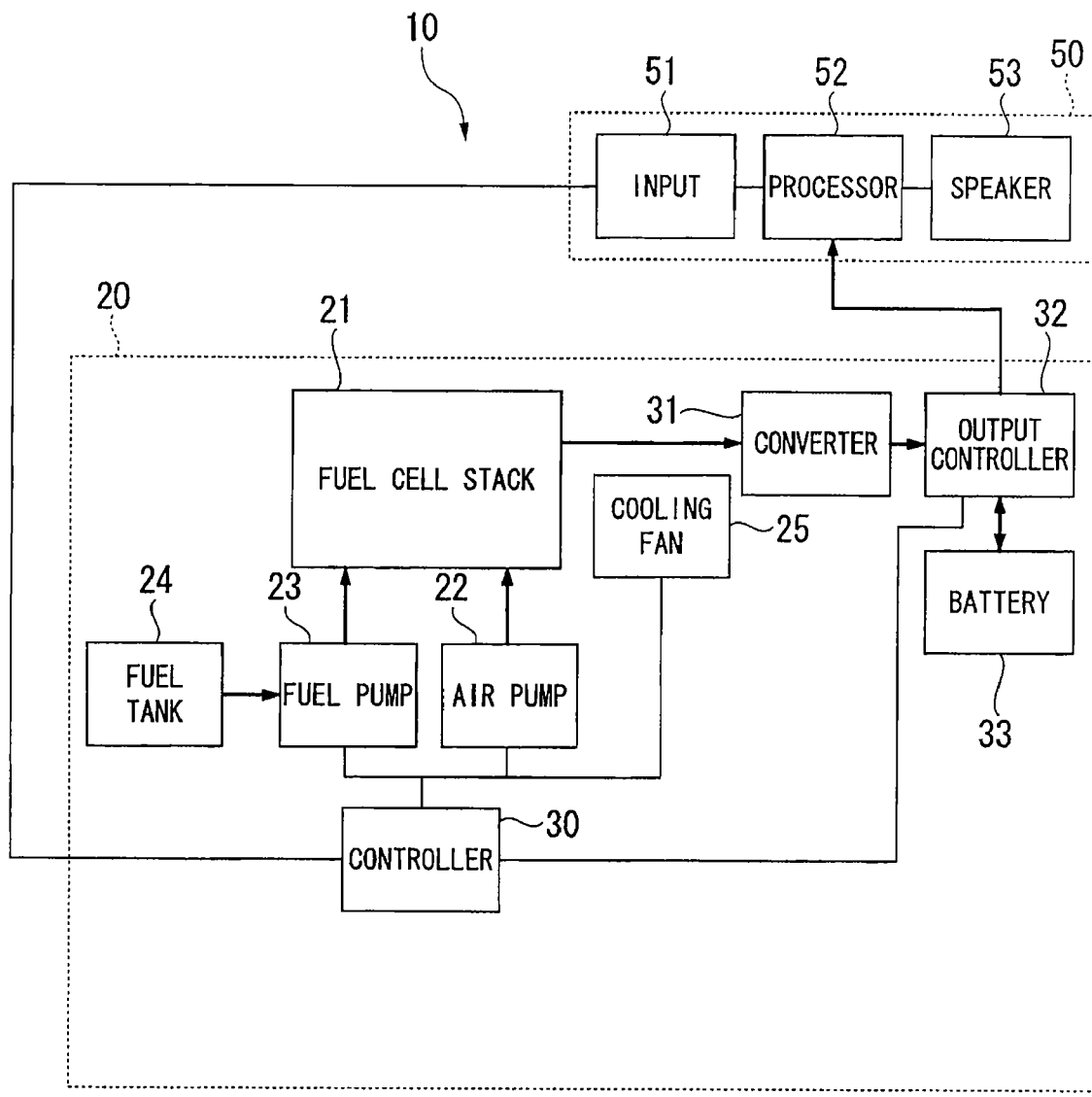
FIG. 4 is a block diagram illustrating a fuel cell system in accordance with a second embodiment of the present invention.

FIG. 4 is a block diagram illustrating a fuel cell system in accordance with a second embodiment of the present invention. A fuel cell system 10 includes a fuel cell unit 20 and an electronic musical instrument 50. In some cases, the electronic musical instrument 50 may integrate the fuel cell unit 20 therein. In other cases, the fuel cell unit 20 is disposed outside the electronic musical instrument 50. Typically, the fuel cell unit 20 is adjacent to the electronic musical instrument 50. It is possible as a modification that the fuel cell system 10 includes the fuel cell unit 20 and an PA (Public Address) system instead of the electronic musical instrument 50.

The fuel cell unit 20 may include a fuel cell stack 21, an air pump 22, a fuel pump 23, a fuel tank 24, a cooling fan 25, a controller 30, a converter 31, an output controller 32, and a battery 33 which are the same as those described in the first embodiment, except for the followings. Duplicate descriptions will be omitted. The electronic musical instrument 50 may include an input unit 51, a processor 52 and a speaker 53 which are the same as those described in the first embodiment, except for the followings. Duplicate descriptions will be omitted.

The fuel cell unit 20 does not include a separate or discrete sound detector which is separate from the elements of the fuel cell unit 20. The function of the sound detector is integrated into the controller 30. Namely, the controller 30 may have not only the control functions as described in the first embodiment, but also substantially the same function as the sound detection by the sound detector 34 that has been described in the first embodiment. The controller 30 of the fuel cell unit 20 may be connected to the input unit 51 of the electronic musical instrument 50 so as to allow the controller 30 to perform the additional function of sound detection that is substantially the same as those of the sound detector 34 described in the first embodiment with reference to FIG. 1.

For example, the controller 30 is configured to control the air pump 22, the fuel pump 23, the cooling fan 25, and the output controller 32. These control functions of the controller 30 are substantially the same as those described in the first embodiment with reference to FIG. 1. In this embodiment, the controller 30 is further configured to perform an additional function of sound detection. The controller 30 detects the intensity of an input that is transmitted from the input unit 51 of the electronic musical instrument 50. The additional function of sound detection of the controller 30 and the input function of the input unit 51 may be considered as constituting a sound volume acquisition unit as a function unit. In some cases, the electronic musical instrument 50 may be, but is not limited to, an electronic piano. In this case, the controller 30 may be configured to detect, as the intensity of input, the speed and stroke by which a key of the keyboard is pushed down.

The sound volume spoken by the electronic musical instrument 50 corresponds to the intensity of an input that is transmitted from the input unit 51 of the electronic musical instrument 50. As a key is pushed down at large speed and stroke, the intensity of the input from the input unit 51 is high. In this case, the speaker 53 of the electronic musical instrument 50 speaks a sound at large volume. As a key is pushed down at small speed and stroke, the intensity of the input from the input unit 51 is low. In this case, the speaker 53 of the electronic musical instrument 50 speaks a sound at small volume.

Thus, the controller 30 can detect the intensity of an input from the input unit 51, thereby evaluating the sound volume generated by the speaker 53 of the electronic musical instrument 50.

It is possible as a modification that the controller 30 is connected to the processor 52 to detect the intensity of an input.

Similarly to the first embodiment, the controller 30 controls the rotational rates of motors that drive the air pump 22, the fuel pump 23, and the cooling fan 25 which constitute the auxiliary unit of the fuel cell unit 20. The controller 30 controls the rotational rates discontinuously or continuously as described in the first embodiment.

Since the controller 30 directly detects information of the sound volume from the input unit 51, the fuel cell unit 20 does not need including a separate or discrete sound detector that is separate from the controller 30. This configuration that the controller 30 directly detects information of the sound volume from the input unit 51 can shorten the time period from the input into the input unit 51 until controlling the auxiliary unit of the fuel cell unit 20. Shortening this time period ensures to avoid that noises generated by the auxiliary unit disturb the musical performance by the electronic musical instrument 50.

Third Embodiment

Figure 5:
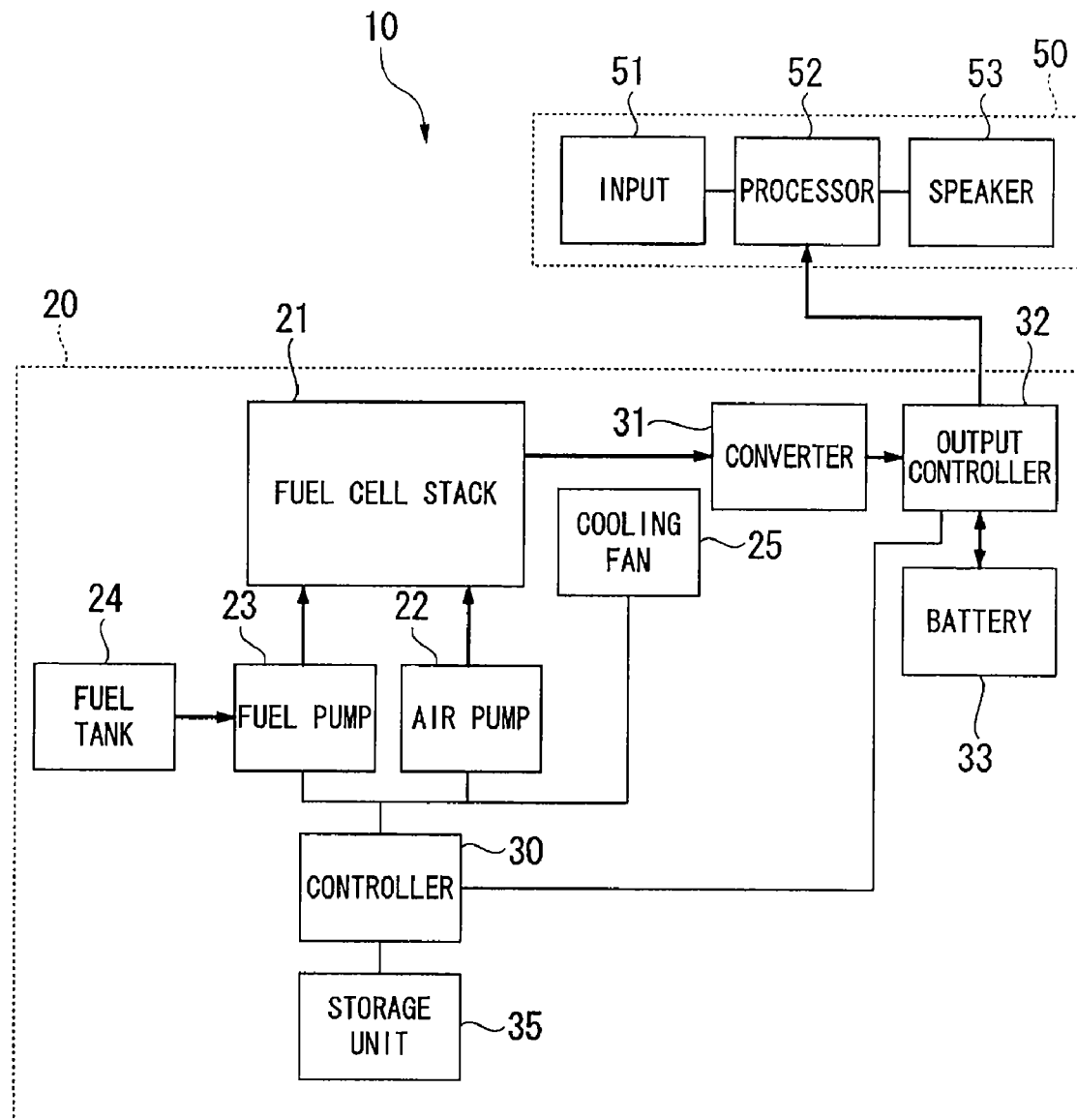
FIG. 5 is a block diagram illustrating a fuel cell system in accordance with a third embodiment of the present invention.

FIG. 5 is a block diagram illustrating a fuel cell system in accordance with a third embodiment of the present invention. A fuel cell system 10 includes a fuel cell unit 20 and an electronic musical instrument 50. In some cases, the electronic musical instrument 50 may integrate the fuel cell unit 20 therein. In other cases, the fuel cell unit 20 is disposed outside the electronic musical instrument 50. Typically, the fuel cell unit 20 is adjacent to the electronic musical instrument 50. It is possible as a modification that the fuel cell system 10 includes the fuel cell unit 20 and an PA (Public Address) system instead of the electronic musical instrument 50.

The fuel cell unit 20 may include a storage unit 35 in addition to a fuel cell stack 21, an air pump 22, a fuel pump 23, a fuel tank 24, a cooling fan 25, a controller 30, a converter 31, an output controller 32, and a battery 33 which are the same as those described in the first embodiment, except for the followings. The storage unit 35 is newly added to the fuel cell unit 20. The fuel cell unit 20 does not include an additional function of sound detector. The electronic musical instrument 50 may include an input unit 51, a processor 52 and a speaker 53 which are the same as those described in the first embodiment, except for the followings. Duplicate descriptions will be omitted.

The storage unit 35 can be provided to store information related to music to be performed by the electronic musical instrument 50. The information that is stored in the storage unit 35 may include, but is not limited to, music programs and/or music data, in accordance with which the electronic musical instrument 50 performs music. The storage unit 35 is connected to the controller 30. The storage unit 35 can be realized by, but not limited to, a non-volatile memory, a volatile memory, a hard disk, or other disks. It is possible as a modification that the controller 30 has an additional function to store information related to music to be performed by the electronic musical instrument 50. The ROM or RAM in the controller 30 can be used to store the information related to music to be performed by the electronic musical instrument 50. Namely, the additional function to store information related to music to be performed by the electronic musical instrument 50 can be incorporated into the controller 30. In this case, there is no need to provide the storage unit 35 that is separate from the controller 30.

In some cases, the electronic musical instrument 50 may be configured to store programs that include timing charts of music to be performed. In other cases, the electronic musical instrument 50 may be configured to store data that include timing charts of music to be performed. In these cases, the storage unit 35 can be configured to store the same programs or data as stored in the electronic musical instrument 50, so as to allow the controller 30 to obtain information of the sound volume of the performed music in synchronizing with the performance of the music by the electronic musical instrument 50. The controller 30 can control the operations of the air pump 22, the fuel pump 23 and the cooling fan 25, the controlling being based on the information about sound volume that included in the programs or data stored in the storage unit 35.

In still other cases, the storage unit 35 can be configured to store music performance data that have been recorded in rehearsal, without storing the program of the music to be performed by the electronic musical instrument 50. Electric data are prepared based on the music performance in rehearsal. The prepared electric data are then stored in the storage unit 35. The controller 30 may control the operations of the auxiliary unit of the fuel cell unit 20, based on the music performance data or information about the sound volume that is included in the music performance data which are recorded in rehearsal.

In the third embodiment the storage unit 35 can be configured to store information about music to be performed by the electronic musical instrument 50. The controller 30 controls the operations of the auxiliary unit of the fuel cell unit 20, based on the information that is stored in the storage unit 35. The controller 30 controls the operations of the auxiliary unit, synchronized with the performance of music by the electronic musical instrument 50. Namely, the controller 30 controls the operations of the auxiliary unit, thereby controlling the sound noise generated by the auxiliary unit, synchronized with the performance of music by the electronic musical instrument 50.

Fourth Embodiment

Figure 6:
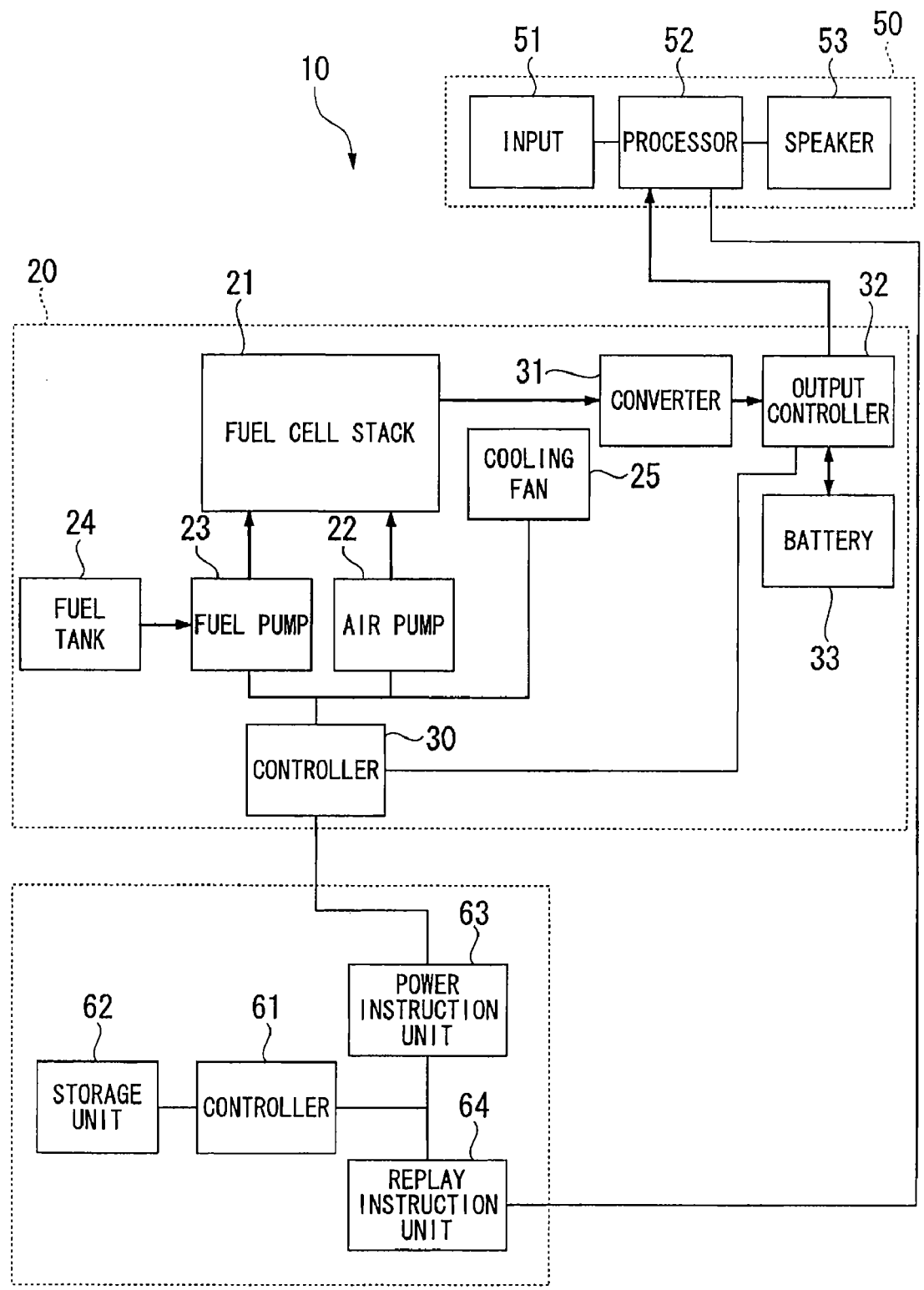
FIG. 6 is a block diagram illustrating a fuel cell system in accordance with a fourth embodiment of the present invention.

FIG. 6 is a block diagram illustrating a fuel cell system in accordance with a fourth embodiment of the present invention. A fuel cell system 10 includes a fuel cell unit 20, an electronic musical instrument 50, and a power controller 60. In some cases, the electronic musical instrument 50 may integrate the fuel cell unit 20 therein. In other cases, the fuel cell unit 20 is disposed outside the electronic musical instrument 50. Typically, the fuel cell unit 20 is adjacent to the electronic musical instrument 50. It is possible as a modification that the fuel cell system 10 includes the fuel cell unit 20 and an PA (Public Address) system instead of the electronic musical instrument 50.

The power controller 60 may be disposed either outside or inside the electronic musical instrument 50. The power controller 60 may perform as, but not limited to, a sequencer 60. The power controller 60 may be coupled to the fuel cell unit 20 and the electronic musical instrument 50. The power controller 60 may be configured to control power that is generated by the fuel cell unit 20. The power controller 60 may also be configured to give the electronic musical instrument 50 instructions to perform music or replay the music.

The power controller 60 performing as a sequencer may include, but is not limited to, a controller 61, a storage unit 62, a power instruction unit 63, and a replay instruction unit 64. The power controller 60 as a sequencer may be realized by, but is not limited to, a microcomputer which may include a CPU, a ROM and a RAM.

The power controller 60 performing as a sequencer may be configured to generate output information based on audio data that are stored in the storage unit 62. For example, the storage unit 62 stores audio data. The controller 61 is configured to give the replay instruction unit 64 the audio data that is stored in the storage unit 62. The replay instruction unit 64 is configured to generate output information based on the audio data. The replay instruction unit 64 is configured to supply the output information to the electronic musical instrument 50. The electronic musical instrument 50 generates a sound or performs a music, based on the output information that has been generated by the replay instruction unit 64 in the power controller 60.

The storage unit 62 may, for example, store voice data in MIDI format. Typical examples of the vice data of the MIDI format may include, but are not limited to, "note on", "note off", "velocity" which are needed to generate a sound, perform a music, or replay the sound or music. The audio data of the MIDI format may further include, in addition to the above data, various types of additional data that are used to effect the sound or music to be performed or replayed.

The replay instruction unit 64 of the power controller 60 performing as the sequencer may be configured to generate output information that is related to a sound or music to be performed or replayed by the electronic musical instrument 50, wherein the generation is made based on the above-described various types of additional data. The available format of the audio data may be other formats such as MPEG4, instead of the MIDI.

As described above, the power controller 60 performing as a sequencer may include the power instruction unit 63. The controller 61 gives the power instruction unit the audio data that is stored in the storage unit 62. The power instruction unit 63 may be configured to generate power information based on the audio data that is stored in the storage unit 62. The power instruction unit 63 may be configured to supply the power information to the controller 30 in the fuel cell unit 20. In the fuel cell unit 20, the controller 30 sets the power level based on the power information, wherein the power level is a level at which the fuel cell unit 20 generates power and supplies it to the electronic musical instrument 50.

The audio data that is stored in the storage unit 62 includes various types of information that are related to performing and/or replaying the sound or music to be performed by replayed. In the power controller 60 performing as a sequencer, as described above, the replay instruction unit 64 may generate output information that is related to a sound or music to be performed or replayed by the electronic musical instrument 50, and the power instruction unit 63 may generate, based on the audio data, power information that is related to the power level at which the power is generated by the fuel cell unit 20.

For example, the power instruction unit 63 may generate the power information, based on information related to sound volume that is included in the audio data. A large sound noise generated by the fuel cell unit 20 can not provide any substantive influence to a large sound or music performed or replayed by the electronic musical instrument 50. A large sound noise generated by the fuel cell unit 20 can not provide any substantive influence to a small sound or music performed or replayed by the electronic musical instrument 50. The power controller 60 performing as a sequencer renders the replay instruction unit 64 generate the output information and also renders the power instruction unit 63 generate power information that is related to the output information.

In some cases, the power instruction unit 63 may set the power formation as follows.

A first example of how to set the power formation for allowing the electronic musical instrument 50 to perform music may be as follows. The power instruction unit 63 acquires a predetermined set of acoustic data before the electronic musical instrument 50 performs music later. The electronic musical instrument 50 performs music based on a set of acoustic data, while the power instruction unit 63 acquires a further set of acoustic data, based on which the electronic musical instrument 50 will perform music later. The power instruction unit 63 acquires acoustic data unit-by-unit, or syllable-by-syllable. Each unit may include one or plural syllable.

The power instruction unit 63 detects the smallest sound volume in the acquired range of acoustic data. If the acoustic data is the MIDI format, the sound volume may be detected from "velocity" that is included in the acoustic data of the MIDI format. The sound volume may be detected from not only "velocity" but in consideration of additional information that is related to the other sound effects. The detection of sound may be made optionally. In order to allow the electronic musical instrument 50 to perform music in the acquired range of acoustic data, the power instruction unit 63 may set power information such that the sound noise generated by the fuel cell unit 20 is smaller than the detected smallest sound volume. As a result, the power generated by the fuel cell unit 20 is controlled, while the sound noise generated by the fuel cell unit 20 is maintained to be smaller than the smallest volume detected from the acquired range of acoustic data.

A second example of how to set the power formation for allowing the electronic musical instrument 50 to perform music may be as follows. The power instruction unit 63 acquires a predetermined set of acoustic data before the electronic musical instrument 50 performs music later. The electronic musical instrument 50 performs music based on a set of acoustic data, while the power instruction unit 63 acquires a further set of acoustic data, based on which the electronic musical instrument 50 will perform music later. The power instruction unit 63 acquires acoustic data unit-by-unit, or syllable-by-syllable. Each unit may include one or plural syllable.

The power instruction unit 63 detects an averaged sound volume in the acquired range of acoustic data. In order to allow the electronic musical instrument 50 to perform music in the acquired range of acoustic data, the power instruction unit 63 may set power information such that the sound noise generated by the fuel cell unit 20 is smaller than the averaged sound volume in the acquired range of acoustic data. As a result, the power generated by the fuel cell unit 20 is controlled, while the sound noise generated by the fuel cell unit 20 is maintained to be smaller than the averaged sound volume detected from the acquired range of acoustic data.

As described above, the power instruction unit 63 acquires information related to the sound volume from the acoustic data before the electronic musical instrument 50 performs or replays music later, based on the acoustic data. The power instruction unit 63 controls the power or sound noise generated by the fuel cell unit 20, based on the acquired information related to the sound volume. The power instruction unit 63 may acquire an optional range of acoustic data. Shortening the optional range of acoustic data may allow the power instruction unit 63 controls, tone-by-tone, the power or sound noise generated by the fuel cell unit 20. Extending the optional range of acoustic data may allow the power instruction unit 63 controls, music by music, the power or sound noise generated by the fuel cell unit 20.

In accordance with the fourth embodiment of the present invention, the power controller 60 performing as a sequencer may generate output information and power information, based on the acoustic data that is stored in the storage unit 62. The power information may be used to control the power generated by the fuel cell unit 20. The electric power or sound noise generated by the fuel cell unit 20 is controlled synchronizing with the performance or replay of music by the electronic musical instrument 50 based on the acoustic data. The sound noise generated by the fuel cell unit 20 is reduced synchronizing with the performance or replay of music by the electronic musical instrument 50, thereby reducing the influence of sound noise to the performance or replay by the electronic musical instrument 50.

In the foregoing embodiments, the air pump 22, the fuel pump 23 and the cooling fan 25 constitute the auxiliary unit. In other cases, the auxiliary unit may be modified as long as the modified unit can operate the fuel cell unit 20. In still other cases, the auxiliary unit may further include additional element that can operate the fuel cell unit 20 in cooperation with the air pump 22, the fuel pump 23 and the cooling fan 25.

In the foregoing embodiments, the controller 30 controls the operations of the auxiliary unit that may include the air pump 22, the fuel pump 23 and the cooling fan 25, wherein the control is made based on the sound volume generated by the electronic musical instrument 50.

It is possible as a modification that the controller 30 controls the operations of the auxiliary unit, based on environments of the electronic musical instrument 50 or the PA system. When the electronic musical instrument 50 or the PA system is used for events such as a party or a lecture, the controller 30 can control the operations of auxiliary unit, based on the environments of an event. If the volume of the environmental sound is large, the controller 30 controls the operations of the auxiliary unit to increase the power generated by the fuel stack 21, while increasing the sound noise generated by the auxiliary unit. The increased sound noise may be drowned out by the environmental sound of large volume. If the volume of the environmental sound is small, the controller 30 controls the operations of the auxiliary unit to decrease the power generated by the fuel stack 21, while decreasing the sound noise generated by the auxiliary unit. The decreased sound noise may not disturb the music performance in the environmental sound of small volume.

Preferably, a sound pressure sensor can be used to detect the volume of an environmental sound so as to allow the controller 30 controls the operations of the auxiliary unit, based on the detected environmental sound volume. The speaker 53 of the electronic musical instrument 50 is located at a certain position. In order to detect the sound volume generated by the speaker 53, a microphone having a high directivity can preferably be used. In order to detect the environmental sound volume, another microphone having a low directivity can preferably be used. It is also possible to disperse a plurality of microphones over a wide area.

The term "sound" may include the meaning that is generally known as vibrational transmission of mechanical energy that propagates through matter as a wave that can be audibly perceived by a living organism through its sense of hearing.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A fuel cell system comprising:
   a fuel cell that supplies an electric power to a sound generating device that generates a sound;
   an auxiliary unit that allows the fuel cell to generate the electric power;
   a sound volume acquisition unit that acquires information that is related to at least one of the volume of the sound that is generated by the sound generating device and the volume of an environmental sound; and
   a control unit that controls the operations of the auxiliary unit, based on the information acquired by the sound volume acquisition unit.

2. The fuel cell system according to claim 1, wherein the sound volume acquisition unit acquires the information related to the volume of the sound, from a program that instructs the sound generating device to generate the sound.

3. The fuel cell system according to claim 1, wherein the sound volume acquisition unit acquires the information related to the volume of the sound, from the sound generating device.

4. The fuel cell system according to claim 1, wherein the sound volume acquisition unit acquires the information related to the volume of the sound, based on information related to an input into the sound generating device.

5. The fuel system according to claim 1, wherein the sound volume acquisition unit acquires the information related to the volume of an environmental sound.

6. The fuel cell system according to claim 1, wherein the controller controls discontinuously the operations of the auxiliary unit, based on the information acquired by the sound volume acquisition.

7. The fuel cell system according to claim 1, wherein the controller controls continuously the operations of the auxiliary unit, based on the information acquired by the sound volume acquisition.

8. The fuel cell system according to claim 1, wherein the sound volume acquisition unit comprises a storage unit that stores acoustic data, wherein the sound generating device generates the sound based on the acoustic data, and wherein the control unit controls the operations of the auxiliary unit based on at least a part of the acoustic data.

9. A fuel cell system comprising:
   a fuel cell that supplies an electric power to a sound generating device that generates a sound;
   an auxiliary unit that allows the fuel cell to generate the electric power ;
   a storage unit that stores acoustic data, based on which the sound generating device generates the sound; and
   a control unit that controls the operations of the auxiliary unit, based on at least a part of the acoustic data.

10. The fuel cell according to claim 9, wherein the acoustic data includes information related to the volume of the sound, and the control unit controls the operations of the auxiliary unit based on the information related to the volume of the sound.

11. The fuel cell system according to claim 9, further comprising:
 a power instruction unit that controls power generated by the fuel cell, based on the acoustic data; and
 a replay instruction unit that supplies instructions to the sound generating device to perform or replay the sound.

12. A power control system for controlling power generated by a fuel cell, the fuel cell being controlled by an auxiliary unit to supply an electric power to a sound generating device that generates a sound, the power control system comprising:

a storage unit that stores acoustic data, based on which the sound generating device generates the sound;
 a sound volume acquisition unit that acquires information that is related to at least one of the volume of the sound that is generated by the sound generating device; and
 a control unit that controls the operations of the auxiliary unit, based on the information acquired by the sound volume acquisition unit.

\* \* \* \* \*